United States Patent [19]

Robeson

[11] Patent Number: 4,532,288

[45] Date of Patent: Jul. 30, 1985

[54] POLY(ARYL ETHER) BLENDS

[75] Inventor: Lloyd M. Robeson, Whitehouse Station, N.J.

[73] Assignee: Union Carbide Corporation, Danbury, Conn.

[21] Appl. No.: 391,382

[22] Filed: Jun. 23, 1982

Related U.S. Application Data

[63] Continuation-in-part of Ser. No. 363,100, Mar. 29, 1982, abandoned.

[51] Int. Cl.³ .............................................. C08K 5/41
[52] U.S. Cl. .................................... 524/375; 524/370; 524/171; 525/68; 525/132; 525/133
[58] Field of Search ..................... 524/370, 375, 171; 525/68, 132, 133

[56] References Cited

U.S. PATENT DOCUMENTS

| | | | |
|---|---|---|---|
| 3,238,087 | 3/1966 | Norwalk et al. | 428/417 |
| 3,264,536 | 8/1966 | Robinson et al. | 528/219 |
| 3,277,051 | 10/1966 | Wynstra | 528/90 |
| 3,294,747 | 12/1966 | Fry | 528/95 |
| 3,305,528 | 2/1967 | Wynstra et al. | 528/95 |
| 3,390,126 | 6/1968 | Davis | 524/375 |
| 3,555,119 | 9/1967 | Ingulli et al. | 528/174 |
| 3,565,862 | 2/1971 | Campbell et al. | 528/174 |
| 3,944,631 | 3/1976 | Yu et al. | 525/305 |
| 4,175,175 | 11/1979 | Johnson et al. | 528/219 |
| 4,231,922 | 11/1980 | Robeson | 524/371 |

Primary Examiner—Joseph L. Schofer
Assistant Examiner—N. Sarofim
Attorney, Agent, or Firm—Donald M. Papuga

[57] ABSTRACT

Described herein are molding compositions comprising a blend of a poly(aryl ether) polymer, a styrene and/or acrylic copolymers and a compatibilizing amount of a polyhydroxyether. These blends have improved mechanical properties.

19 Claims, No Drawings

POLY(ARYL ETHER) BLENDS

This application is a Continuation-In-Part application of U.S. patent application Ser. No. 363,100 filed on Mar. 29, 1982, now abandoned, in the name of L. M. Robeson and titled Poly(Aryl Ether) Blends.

BACKGROUND OF THE INVENTION

This invention is directed to compositions suitable for molding or extrusion comprising a blend of a poly(aryl ether) polymer, a styrene polymer and/or acrylic copolymers and a compatibilizing amount of a polyhydroxyether.

Poly(aryl ether) polymers, particularly polysulfone, are tough, rigid, high strength thermoplastic materals which maintain their properties over a wide temperature range of from $-150°$ F. to above $300°$ F. They have a continuous use temperature of about $300°$ F. They are hydrolytically stable and have excellent mechanical, electrical and chemical properties which allows them to be molded into a variety of articles.

U.S. Pat. No. 3,555,119 describes blends of thermoplastic polysulfone resin with an acrylonitrile-styrene-butadiene (ABS) plastic. These blends are described in the patent as characterized by a particularly high heat distortion temperature in combination with good flow characteristics.

However, blends of polysulfone resins and ABS plastic have only marginal mechanical compatibility. This marginal compatibility is manifested in poor weld-line strength as well as poor surface appearance of articles injection molded from such blends.

It has now been found that when a polyhydroxyether is added to a blend of a poly(aryl ether) and a styrene and/or acrylic copolymer, the resulting blend has improved compatibility as shown by improved weld-line strength, improved mechanical properties, such as impact strength, elongation at break and tensile strength. In addition, the surface of an article injection molded from such a blend has an improved surface appearance.

THE INVENTION

This invention is directed to a composition suitable for molding or extrusion comprising a blend of a poly(aryl ether) polymer, a styrene and/or acrylic copolymer, and a compatibilizing amount of a polyhydroxyether.

The poly(aryl ether) polymer may be described as a linear, thermoplastic polyarylene polyether wherein the arylene units are interspersed with other ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., $-SO_2-$ or $-CO-$, between arylene groupings, to provide sulfone or ketone units in the polymer chain in addition to arylene units and ether units. The polymer has a basic structure comprising recurring units of the formula: $0-E-0-E'$ wherein E is the residuum, of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, as,

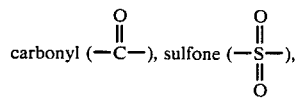

two phenolic nuclei are joined to the same or different carbon atoms of the residue.

Such dinuclear phenols can be characterized as having the structure:

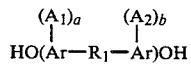

wherein Ar is an aromatic group and preferably is a phenylene group, $A_1$ and $A_2$ can be the same or different inert substituent groups such as alkyl groups having from 1 to 4 carbons atoms, halogen atoms, i.e., fluorine, chlorine, bromine or iodine, or alkoxy radicals having from 1 to 4 carbon atoms, a and b are integers having a value from 0 to 4, inclusive, and $R_1$ is representative of a bond between aromatic carbon atoms as in dihydroxyldiphenyl, or is a divalent radical, including for example, radicals such as

$-O-$, $-S-$, $-SO-$, $-S-S-$, $-SO_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols include among others: the bis-(hydroxyphenyl) alkanes such as 2,2-bis-(4-hydroxyphenyl)-propane, 2,4'-dihydroxydiphenylmethane, bis-(2-hydroxyphenyl) methane, bis-(4-hydroxyphenyl)methane bis(4-hydroxy-2,6-dimethyl-3-methoxyphenyl)methane, 1,1-bis-(4-hydroxyphenyl)ethane, 1,2-bis-(4-hydroxy-phenyl)ethane, 1,1-bis-(4-hydroxy-2-chlorophenyl)-ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxy-naphthyl)-propane, 2,2-bis-(4-hydroxyphenyl)pentane, 3,3-bis-(4-hydroxyphenyl)pentane, 2,2-bis-(4-hydroxyphenyl)heptane, bis-(4- hydroxyphenyl)phenylmethane, 2,2-bis-(4-hydroxyphenyl)-1-phenyl-propane, 2,2-bis-(4-hydroxyphenyl)-1,1,1,3,3,3,-hexafluoro- propane, and the like;

di(hydroxyphenyl)sulfones such as bis-(4-hydroxyphenylsulfone), 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3-, dihydroxyphenyl ethers, 4,4'-dihydroxy-2,6-di methyldiphenyl ether, bis-(4-hydroxy-3-isobutyl phenyl)ether, bis-(4-hydroxy-3-isopropylphenyl) ether, bis-(4-hydroxy-3-chlorophenyl)ether, bis-(4-hydroxy-3-fluorophenyl)ether, bis-(4- hydroxy-3-bromophenyl)ether, bis-(4-hydroxynaphthyl)ether, bis-(4-hydroxy-3-chloronaphthyl) ether, and 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through an aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluoro diphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzeonid nucleus are either hydrogen (zero electron withdrawing), or other groups having a positive sigma value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem. Rev.*, 53, 222; JACS, 74,3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

the sulfoxide group

the azo group —N=N—; the saturated fluorocarbon groups —CF$_2$CF$_2$—; organic phosphine oxides

where R$_2$ is a hydrocarbon group, and the ethylidene group

where X$_1$ can be hydrogen or halogen and activating groups within the nucleus which can activate halogens or nitro functions on the same ring such as in the case with difluorobenzoquinone, 1,4- or 1,5- or 1,8-difluoro anthraquinone, etc.

If desired, the polymers may be made with mixtures of two or more dihalobenzenoid or dinitro benzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

A preferred form of the polyarylene polyethers of this invention are those prepared using the dihydric polynuclear phenols of the following four types, including the derivatives thereof which are substituted with inert substituent groups

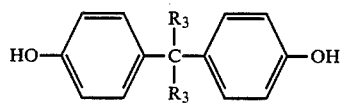 (a)

in which the $R_3$ group represents independently hydrogen, lower alkyl, aryl and the halogen substituted groups thereof, which can be the same or different;

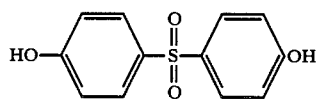 (b)

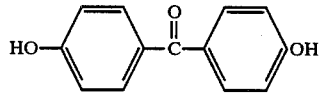 (c)

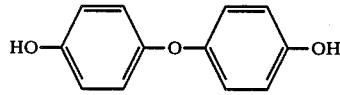 (d)

and substituted derivatives thereof.

It is also contemplated in this invention to use a mixture of two or more different dihydric phenols to accomplish the same ends as above. Thus when referred to above the -E- residuum in the polymer structure can actually be the same or different aromatic residue.

In order to secure the high polymers, the system should be substantially anhydrous, and preferably with less than 0.5 percent by weight water in the reaction mixtures.

The poly(aryl ether)s have a reduced viscosity of from about 0.30 to about 1.5 as measured in an appropriate solvent at an appropriate temperature depending on the particular polyether, such as in methylene chloride at 25° C.

The preferred poly(aryl ether)s have repeating units of the formula:

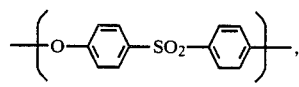,

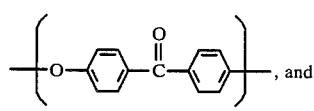, and

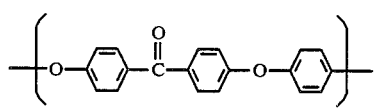

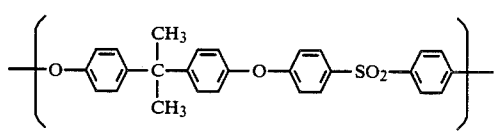

The styrene polymers suitable for use herein are co-or higher polymers and include ABS type polymers, the molecules of which contain two or more polymeric parts of different compositions that are bonded chemically. The polymer is preferably prepared by polmerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the polymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

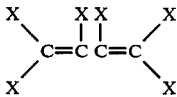

wherein X is selected from the group consisting of hydrogen, alkyl groups containing from one to five carbon atoms, chlorine or bromine. Examples of dienes that may be used are butadiene, isoprene, 1,3 - heptadiene, methyl-1,3-pentadiene, 2,3-dimethyl -1,3-butadiene, 2-ethyl -1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer of group of monomers that may be polymerized in the presence of the prepolymerized backbone are monovinylaromatic hydrocarbons. The monovinylaromatic monomers utilized are generically described by the following formula:

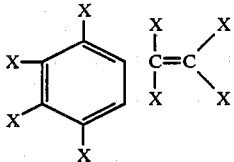

wherein X is as previosly defined. Examples of the monovinylaromatic compounds and alkly-,cycloalkyl-, aryl-, alkaryl-, aralkyl-, alkoxy-,aryloxy-, and other substituted vinylaromatic compounds include styrene, 3-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, p-tertbutylstyrene, tetra-chlorostyrene, mixtures thereof, and the like. The preferred monovinylaromatic hydrocarbons used are styrene and/or αmethylstyrene.

A second group of monomers that may be polymerized in the presence of the prepolymerized backbone are acrylic monomers such as acrylonitrile, substituted acrylonitrile and/or acrylic acid esters, exemplified by alkyl acrylates such as ethyl acrylate and methyl methacrylate, and maleic anhydride.

The acrylonitrile, substituted acrylonitrile, or acrylic acid esters are described by the following formula:

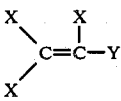

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, chloracrylonitrile, bromoacrylonitrile, and α-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50 percent by weight of the total graft polymer composition. The monomers polymerized in the presence of the backbone, exemplified by stryene and acrylonitrile, comprise from about 40 to about 95 percent by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyreneacrylonitrile copolymer. Also, there are occasions where a copolymer, such as α-methylstyrene-acrylonitrile, is added to the graft polymer copolymer blend. When the graft polymer- copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, elastomers such as ethylene-propylene-diene rubber and isobutyleneisoprene copolymers may be used.

The acrylate copolymer includes copolymers or higher polymers of methyl methacrylate with a vinyl monomer (e.g. acrylonitrile, N-allymaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70 percent by weight of this copolymer resin. Methylmethyacrylate may comprise 100 percent of this resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The acrylate resins have a reduced viscosity of from 0.1 to about 2.0 dl/g in a one percent chloroform solution at 25° C.

Also included herein are acrylate-styreneacrylonitrile polymers which are known in the art and described, for example, in U.S. Pat. No. 3,944,631. The acrylate which may be used to prepare the polymer includes the crosslinked polymers of the $C_2$–$C_{10}$ alkyl acrylate and the $C_8$–$C_{22}$ alkyl methacrylate monomers, preferably the $C_4$–$C_8$ alkyl acrylates, such as poly(n-butyl acrylate), poly(ethyl acrylate) and poly(2-ethyl hexylacrylate). These polymers are prepared by methods well known in the art such as described in said U.S. Pat. No. 3,944,631.

The thermoplastic polyhydroxyethers which may be used herein have the following general formula:

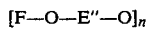

where F is the radical residuum of a dihydric phenol, E″ is a radical residuum of an epoxide selected from mono and diepoxides and which contain from 1 to 2 hydroxyl groups, and n is an integer which represents the degree of polymerization and is at least about 20 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

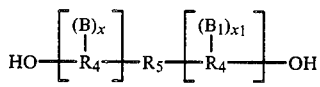

wherein $R_4$ is an aromatic divalent hydrocarbon radical, such as naphthylene and phenylene with phenylene being preferred, B and $B_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, x and $x_1$ are independently integers of 0 to 4, $R_5$ is alkylene, alkylidene, cycloalkylene or a saturated divalent group. Particularly preferred are dihydric polynuclear phenols having the general formula:

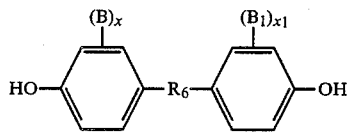

wherein B, $B_1$, x, and $x_1$ are as previously defined, and $R_6$ is an alkylene or alklylidene group, preferably having from 1 to 3 carbon atoms, or cycloalkylene having 6 to 12 carbon atoms.

Diepoxides useful for the preparation of polyhydroxyethers may be represented by repeating units of the following formula:

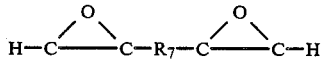

wherein $R_7$ is representative of a bond between adjacent carbon atoms or a divalent organic radical such as an aliphatic, aromatic, cyclic, heterocyclic or acylic arrangement of atoms.

Other diepoxides which can be mentioned include those wherein two oxirane groups are linked through an aromatic ether, i.e., compounds having the grouping

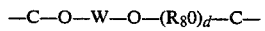

wherein $R_8$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,294,747; and 3,277,051.

The poly(aryl ether) in the composition of this invention is used in amounts of from about 20 to about 85, preferably from about 30 to about 75 weight percent; the styrene and/or acrylic copolymer in amounts of from about 80 to about 15, preferaoly from about 70 to about 25 weight percent, and the polyhydroxyether in amounts of from about 0.5 to about 20, preferably from about 1 to about 10 weight percent.

It should, of course, be obvious to those skilled in the art that other additives may be included in the present compositions. These additives include plasticizers, pigments, thermal stabilizers, ultraviolet light stabilizers, flame retardants, processing aids, impact modifiers and the like.

The impact modifiers which are particularly suitable for use herein are described in U.S. Pat. No. 4,231,922. These impact modifiers are a graft copolymer of a vinyl aromatic, an acrylate, an unsaturated nitrile, or mixtures thereof, grafted onto an unsaturated elastomeric backbone and having a tensile modulus (as measured oy ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly-(isoprene). In each of the polymers there is sufficient butadiene to give the polymer a rubbery character.

The constituents which are grafted onto the unsaturated elastomeric backbone are selected from a vinyl aromatic, such as styrene, α-methylstyrene, alkylstyrene or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commonly available as impact modifiers for poly(vinyl chloride) as described in, for example, V. Shakaypal, in "Developments in PVC Technology", edited by J.H.L. Hensen and A. Whelan, Applied Science Publishers Ltd., New York, 1973.

The grafted constituents of the impact modifier comprise from about 20 to about 60 percent by weight of said constituents such that their tensile modulus does not exceed about 100,000 psi, and is preferably, between about 15,000 to less than about 100,000 psi.

The compositions of this invention are prepared by conventional mixing methods. For example, a preferred method comprises mixing the poly(aryl ether), the styrene and/or acrylic copolymer, and a poly(hydroxyether) and other optional ingredients in powder or granular form in an extruder and extruding the mixture into strands, chopping the strands into pellets and molding the pellets into the desired article.

EXAMPLES

The following Examples serve to give specific illustrations of the practice of this invention but they are not intended in any way to limit the scope of this invention.

In the Examples the polymers used are identified in Table I.

The melt flow of these polymers was measured at 250° C. (44 psi) and at 250° C. (220 psi) on a Tinius-Olsen Melt Index apparatus using a procedure similar to that designated in ASTM D-1238 except that the preheat time was 10 minutes and the temperatures and pressures are the above.

The 1 percent secant modulus of the polymers was measured using a procedure similar to ASTM-D-638 except that ⅛ inch wide, 20 mils thick specimens were used. The glass transition temperature (Tg) of the polymer was measured using resilience-temperature data as described in Polymer-Polymer Miscibility, Academic Press, 1979, by Olabisi et. al. on page 126.

TABLE I

| | Melt Flow Data | | | |
|---|---|---|---|---|
| Polymer | $MF_{10}$ (44 psi) (dg/min) | $MF_{10}$ (220 psi) (dg/min) | 1% Secant Modulus (psi) | Tg (°C.) |
| Cycolac X-37[1] (acrylonitrile/butadiene/styrene/α-methyl styrene | 0.49 | 15.3 | 240,000 | 120 |
| Cycolac T[1] (acrylonitrile/butadiene/styrene) | 1.10 | 29.3 | 230,000 | 100 |
| Cycloac HM-1000[1] (acrylonitrile butadiene/styrene) | No flow | 1.02 | 179,000 | 100 |
| SCC-1004[2] (acrylonitrile/styrene/acrylate) | No flow | 1.55 | 179,000 | 105 |
| Luran S[3] (acrylonitrile/styrene/acrylate) | 0.09 | 9.55 | 200,000 | 110 |
| Cadon 127[4] (styrene/maleic anhydride grafted onto a polybutadiene) | 1.05 | 16.2 | 213,000 | 120 |
| Plexiglas DRF-100[5] [(poly(methyl methacrylate) impact modified with a butadiene based elastomer] | 1.84 | 31.1 | 164,000 | 102 |

[1]Sold by Borg Warner
[2]Sold by Stauffer Chemical Co.
[3]Solo by BASF
[4]Sold by Monsanto Chemical Co.
[5]Sold by Rohm and Haas Co.

CONTROL A

A blend of 50 weight percent of a polysulfone of the following formula:

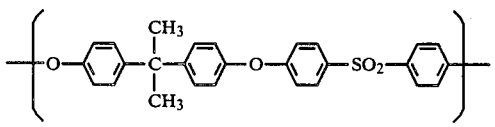

and having a reduced viscosity of 0.43 as measured in chloroform (0.2 grams of polymer in 100 ml at 25° C.), 38 weight percent of an α-methyl styrene acrylonitrile/butadiene/styrene polymer (Cycolac X-37) and 12 weight percent of a styrene/acrylate/butadiene terpolymer (KM-611 sold by Rohm and Haas Company having a tensile modulus of 43,600 psi) was prepared by extrusion blending in a single screw 1-inch diameter extruder with L/D=24/1 at 270°-290° C. The extrudate was chopped into pellets. The pelletized product was then injection molded into ASTM test bars (265°-290° C.) using a Newbury 1 ¼ ounce screw injection molding machine. The test bars were measured for the following properties: tensile strength and modulus according to ASTM D-638; elongation at break according to ASTM D-638; notched izod impact strength according to ASTM D-256 and tensile impact strengtn according to ASTM D-1822.

The results are shown in Table II.

EXAMPLE I

The procedure of Control A was exactly repeated except that 50 weight percent of the polysulfone of Control A was blended with 36 weight percent of the acrylonitrile/butadiene/styrene polymer, 12 weight percent of the styrene/acrylate/butadiene terpolymer and 2 weight percent of a polyhydroxyether which is the reaction product of bisphenol-A and epichlorohydrin (having a reduced viscosity of 0.43 dl/g as measured as 0.2 g/100 ml in tetrahydrofuron at 25° C., PKHH sold by Union Carbide Corporation).

The results are shown in Table II

EXAMPLE II

The procedure of Example I was exactly repeated except that 50 weight percent of the polysulfone of Control A was blended with 34 weight percent of the acrylonitrile/butadiene/styrene polymer, 12 weight percent of the styrene/acrylate/butadiene terpolymer and 4 weight percent of the polyhydroxyether.

The results are shown in Table II.

EXAMPLE III

The procedure of Example I was exactly repeated except that 50 weight percent of the polysulfone of Control A was blended with 32 weight percent of the acrylonitrile/butadiene/styrene polymer, 12 weight percent of the styrene/acrylate/butadiene terpolymer and 6 weight percent of the polyhydroxyether.

The results are shown in Table II.

EXAMPLE IV

The procedure of Example I was exactly repeated except that 50 weight percent of the polysulfone of Control A was blended with 28 weight percent of the acrylonitrile/butadiene/styrene polymer, 12 weight percent of the styrene/acrylate/butadiene terpolymer and 10 weight percent of the polyhydroxyether.

The results are shown in Table II

EXAMPLE V

The procedure of Example I was exactly repeated except that 40 weight percent of the polysulfone of Control A was blended with 20 weight percent of the acrylonitrile/butadiene/styrene polymer, 10 weight percent of the styrene/acrylate/butadiene terpolymer and 20 weight percent of the polyhydroxyether.

The results are shown in Table II. These results demonstrate improved notched izod impact strength, improved tensile impact strength, increased elongation at break, and increased tensile strength. These results are achieved even with as low as 2 weight percent added polyhydroxyether.

TABLE II

| Example | Description of The Composition[1] Polymer | (wt. %) | Tensile Modulus (psi) | Tensile Strength (psi) | Elongation at Break (percent) | Notched Izod Impact Strength (ft.-lbs./in. of Notch) | Tensile Impact Strength (ft.-lbs./in.²) |
|---|---|---|---|---|---|---|---|
| Control A | PS | 50 | 333,000 | 7,870 | 47.5 | 4.3 | 85 |
| | Cycolac X-37 | 38 | | | | | |

TABLE II-continued

| Example | Description of The Composition[1] Polymer | (wt. %) | Tensile Modulus (psi) | Tensile Strength (psi) | Elongation at Break (percent) | Notched Izod Impact Strength (ft.-lbs./in. of Notch) | Tensile Impact Strength (ft.-lbs./in.[2]) |
|---|---|---|---|---|---|---|---|
| I | KM-611 | 12 | 328,00 | 7,850 | 51.7 | 8.1 | 102 |
|  | PS | 50 |  |  |  |  |  |
|  | Cycolac X-37 | 36 |  |  |  |  |  |
| II | KM-611 | 12 | 329,000 | 7,980 | 60 | 13.5 | 105 |
|  | Phenoxy PKHH | 2 |  |  |  |  |  |
|  | PS | 50 |  |  |  |  |  |
|  | Cycolac X-37 | 34 |  |  |  |  |  |
| III | KM-611 | 12 | 320,000 | 8,040 | 60 | 13.5 | 104 |
|  | Phenoxy PKHH | 4 |  |  |  |  |  |
|  | PS | 50 |  |  |  |  |  |
|  | Cycolac X-37 | 32 |  |  |  |  |  |
| IV | KM-611 | 12 | 337,000 | 8,150 | 82 | 14.5 | 102 |
|  | Phenoxy PKHH | 6 |  |  |  |  |  |
|  | PS | 50 |  |  |  |  |  |
|  | Cycolac X-37 | 28 |  |  |  |  |  |
| V | KM-611 | 12 | 343,000 | 8,460 | 90 | 12.9 | 110 |
|  | Phenoxy PKHH | 10 |  |  |  |  |  |
|  | PS | 40 |  |  |  |  |  |
|  | Cycolac X-37 | 20 |  |  |  |  |  |
|  | KM-611 | 10 |  |  |  |  |  |
|  | Phenoxy PKHH | 20 |  |  |  |  |  |

[1]PS = polysulfone

CONTROL B

A blend of 50 wt. percent of the polysulfone as described in Control A, 38 wt. percent of an acrylate/styrene/acrylonitrile terpolymer (Luran S) and 12 wt. percent of KM-611 as described in Control A was prepared by extrusion blending by the procedure as described in Control A. The properties were determined using procedures described in Control A.

The results are shown in Table III.

EXAMPLE VI

The procedure of Control B was exactly repeated except that the blend contained 50 wt. percent polysulfone, 33 wt. percent Luran S, 12 wt. percent KM-611 and 5 wt. percent of the polyhydroxyether as described in Example I.

The results are shown in Table III.

CONTROL C

A blend of 50 wt. percent of the polysulfone described in Control A, 40 wt. percent of an acrylate/styrene/acrylonitrile terpolymer (SCC-1004) and 10 wt. percent of KM-611 as described in Control A was prepared by extrusion blending by the procedure as described in Control A. The properties were determined using procedures described in Control A.

The results are shown in Table III.

EXAMPLE VII

The procedure of Control C was exactly repeated except that the blend contained 50 wt. percent polysulfone, 35 wt. percent SCC-1004, 10 wt. percent of KM-611, and 5 wt. percent of the polyhydroxyether described in Example I.

The results are shown in Table III.

CONTROL D

A blend of 50 wt. percent of the polysulfone described in Control A, 40 wt. percent of a styrene/maleic anhydride copolymer grafted onto a polybutadiene (Cadon 127), and 10 wt. percent KM-611 described in Control A was prepared by extrusion blending by the procedure as described in Control A. The properties were determined using procedures described in Control A.

The results are shown in Table III.

EXAMPLE VIII

A blend of 50 wt. percent of the polysulfone as described in Control A, 35 wt. percent of Cadon 127, 10 wt. percent of KM-611, and 5 wt. percent of a polyhydroxyether as described in Example I was prepared using the same procedure as in Control D.

The results are shown in Table III.

TABLE III

| Example | Description of The Composition[1] Polymer | (wt. %) | Tensile Modulus (psi) | Tensile Strength (psi) | Elongation at Break (percent) | Notched Izod Impact Strength (ft.-lbs./in. of Notch) | Tensile Impact Strength (ft.-lbs./in.[2]) |
|---|---|---|---|---|---|---|---|
| B | PS | 50 | 327,000 | 7,110 | 29 | 3.1 | 29 |
|  | LuranS | 38 |  |  |  |  |  |
|  | KM-611 | 12 |  |  |  |  |  |
| VI | PS | 50 | 338,000 | 7,440 | 50 | 3.3 | 59 |
|  | LuranS | 33 |  |  |  |  |  |
|  | KM-611 | 12 |  |  |  |  |  |
|  | Phenoxy PKHH | 5 |  |  |  |  |  |
| C | PS | 50 | 306,000 | 7,130 | 75 | 11.8 | 42 |
|  | SCC-1004 | 40 |  |  |  |  |  |
|  | KM-611 | 10 |  |  |  |  |  |
| VII | PS | 50 | 301,000 | 7,460 | 92 | 12.4 | 53 |
|  | SCC-1004 | 35 |  |  |  |  |  |
|  | Phenoxy PKHH | 5 |  |  |  |  |  |
|  | KM-611 | 10 |  |  |  |  |  |

TABLE III-continued

| Example | Description of The Composition[1] Polymer | (wt. %) | Tensile Modulus (psi) | Tensile Strength (psi) | Elongation at Break (percent) | Notched Izod Impact Strength (ft.-lbs./in. of Notch) | Tensile Impact Strength (ft.-lbs./in.[2]) |
| --- | --- | --- | --- | --- | --- | --- | --- |
| D | PS | 50 | 354,000 | 7,090 | 32 | 1.3 | 31 |
|   | Cadon 127 | 40 |   |   |   |   |   |
|   | KM-611 | 10 |   |   |   |   |   |
| VIII | PS | 50 | 351,000 | 7,170 | 75 | 2.7 | 66 |
|   | Cadon 127 | 35 |   |   |   |   |   |
|   | Phenoxy PKHH | 5 |   |   |   |   |   |
|   | KM-611 | 10 |   |   |   |   |   |

PS = Polysulfone

CONTROL E

A blend of 50 wt. percent of the polysulfone as described in Control A, 40 wt. percent of poly(methyl methacrylate) impact modified with a butadiene based elastomer (Plexiglas DRF-100), 9.8 wt. percent of the KM-611 as described in Control A, and 0.2 wt. percent of Irganox 1010 (an antioxidant sold by Ciba-Geigy) was blended using the procedure as described in Control A. The notched izod impact strength and tensile impact strength of this blend are listed in Table IV.

EXAMPLE IX

The procedure of Control E was exactly repeated except that the blend contained 50 wt. percent polysulfone, 36 wt. percent Plexiglas DRF-100, 9.8 wt. percent of KM-611, 0.2 wt. percent Irganox 1010 and 4.0 wt. percent of the polyhydroxyether as described in Example I. The notched izod impact strength and tensile impact strength of this blend are listed in Table IV.

CONTROL F

A blend of 50 wt. percent of poly(ether sulfone) having a reduced viscosity of 0.48 as measured in n-methylpyrrolidone at 25° C. (PES-200P sold by ICI) having repeating units of the following formula:

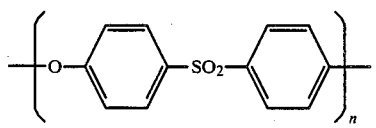

was blended with 40 wt. percent of Plexiglas DRF-100 as described in Control E, and 10 wt. percent KM-611 as described in Control A in an extruder at 285° C. The notched izod impact strength and tensile impact strength of this blend are listed in Table IV.

EXAMPLE X

The procedure of Control F was exactly repeated except that the blend contained 50 wt. percent of the poly(ether sulfone), 35 wt. percent Plexiglas DRF-100, 10 wt. percent KM-611, and 5 wt. percent of a polyhydroxyether (Phenoxy PKHH) as described in Example I. The notched izod impact strength and tensile impact strength of this blend are listed in Table IV.

TABLE IV

| Example | Description of The Composition[1] Polymer | (wt. %) | Notched Izod Impact Strength (ft.-lbs./in. of Notch) | Tensile Impact Strength (ft.-lbs./in.[2]) |
| --- | --- | --- | --- | --- |
| E | PS | 50 | 2.0 | 79 |
|   | Plexiglas DRF-100 | 40 |   |   |
|   | KM-611 | 9.8 |   |   |
|   | Irganox 1010 | 0.2 |   |   |
| IX | PS | 50 | 10.0 | 85 |
|   | Plexiglas DRF-100 | 36 |   |   |
|   | KM-611 | 9.8 |   |   |
|   | Irganox 1010 | 0.2 |   |   |
|   | Phenoxy PKHH | 4.0 |   |   |
| F | PES | 50 | 0.9 | 22 |
|   | Plexiglas DRF-100 | 40 |   |   |
|   | KM-611 | 10 |   |   |
| X | PES | 50 | 1.3 | 50 |
|   | Plexiglas DRF-100 | 35 |   |   |
|   | KM-611 | 10 |   |   |
|   | Phenoxy PKHH | 5 |   |   |

PS = Polysulfone
PES = Poly(ether sulfone)

What is claimed:

1. A composition comprising a blend of a poly(aryl ether) polymer, a styrene and/or acrylic copolymer and a compatibilizing amount of a polyhydroxyether.

2. A composition as defined in claim 1 wherein the poly(aryl ether) has recurring units of the formula:

O—E—O—E' wherein E is the residuum of a dihydric phenol and E' is the residuum of a benzenoid compound having inert electron withdrawing groups in at least one of the position ortho and para to the valence bonds and wherein both of said residuum are valently bonded to the ether oxygen through aromatic carbon atoms.

3. A composition as defined in claim 1 wherein the poly(aryl ether) has repeating units of the formula:

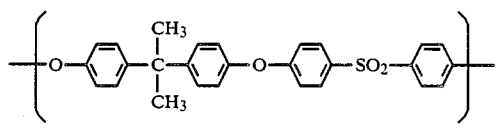

4. A composition as defined in claim 1 wherein the poly(aryl ether) has repeating units of the formula:

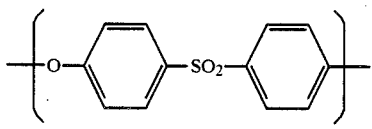

5. A composition as defined in claim 1 wherein the poly(aryl ether) has repeating units of the formula

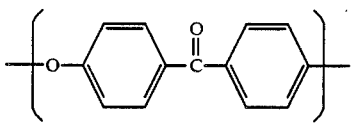

6. A composition as defined in claim 1 wherein the poly(aryl ether) has repeating units of the formula:.

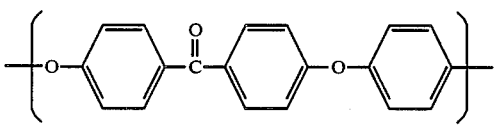

7. A composition as defined in claim 1 wherein the poly(aryl ether) is present in amounts of from about 20 to about 85 weight percent.

8. A composition as defined in claim 1 wherein the styrene copolymer is prepared by polymerizing a conjugated diene monomer with a monomer copolymerizable therewith to provide an elastomeric backbone and thereafter grafting at least one grafting monomer onto said backbone.

9. A composition as defined in claim 8 wherein the conjugated diene monomer is butadiene and the grafting monomer is selected from styrene, acrylonitrile, or mixtures thereof 10. A composition as defined in claim 1 wherein the styrene copolymer is butadiene/styrene/acrylonitrile resin.

11. A composition as defined in claim 1 wherein the acrylic copolymer is a copolymer of methyl methacrylate with a vinyl monomer.

12. A composition as defined in claim 1 wherein the acrylate copolymer is poly(methyl methacrylate) grafted onto an elastomic backbone.

13. A composition as defined in claim 1 wherein the copolymer is an acrylate-styrene-acrylonitrile polymer.

14. A composition as defined in claim 1 wherein the styrene and/or acrylic copolymer is present in amounts of from about 15 to about 80 weight percent.

15. A composition as defined in claim 1 wherein the polyhydroxyether has the general formula:

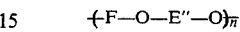

wherein F is the radical residuum of a dihydric phenol, E is a radical residuum of an epoxide selected from mono- and diepoxides and containing from 1 to 2 hydroxyl groups and n is an integer which represents the degree of polymerization and is at least 20.

16. A composition as defined claims 1 and 15 wherein the polyhydroxyether has repeating units of the formula:

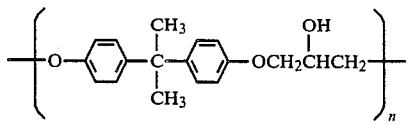

17. A composition as defined in claim 1 wherein the polyhydroxyether is present in amounts of from about 0.5 to about 20 weight percent.

18. A composition as defined in claim 1 which contains an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

19. An article molded from the composition of claims 1 or 15.

* * * * *